United States Patent [19]

Beckmann

[11] Patent Number: 4,517,710
[45] Date of Patent: May 21, 1985

[54] FASTENING CLIP FOR MOTOR VEHICLE TRIM

[75] Inventor: Norbert Beckmann, Cologne, Fed. Rep. of Germany

[73] Assignee: Ford Motor Company, Dearborn, Mich.

[21] Appl. No.: 429,584

[22] Filed: Sep. 30, 1982

[30] Foreign Application Priority Data

Oct. 23, 1981 [DE] Fed. Rep. of Germany ....... 3142061

[51] Int. Cl.³ .................. A44B 17/00; F16B 13/04
[52] U.S. Cl. ...................................... 24/453; 24/297;
52/717; 174/138 D; 403/71; 403/408; 411/340;
411/508
[58] Field of Search ............... 24/289, 292, 297, 352,
24/335, 336, 453, 457, 458; 403/71, 408;
52/716, 717; 411/340, 508, 15, 509, 510, 548;
174/138 D; 292/0.38

[56] References Cited

U.S. PATENT DOCUMENTS

| | | | |
|---|---|---|---|
| 3,037,254 | 6/1962 | Holton | 24/289 |
| 3,074,134 | 1/1963 | Buechler | 24/289 |
| 3,145,439 | 8/1964 | Knowlton | 24/289 |
| 4,289,062 | 9/1981 | Schiefer | 411/340 X |
| 4,312,614 | 1/1982 | Palmer et al. | 24/297 X |
| 4,377,358 | 3/1983 | Wollar | 411/340 X |
| 4,397,595 | 9/1983 | Smith et al. | 411/340 X |

FOREIGN PATENT DOCUMENTS 2201058  7/1973  Fed. Rep. of Germany ...... 411/508
2718170  3/1979  Fed. Rep. of Germany .

Primary Examiner—William E. Lyddane
Assistant Examiner—James R. Brittain
Attorney, Agent, or Firm—Daniel M. Stock; Clifford L. Sadler

[57] ABSTRACT

A fastening clip is disclosed for use in fastening a component with a hole through it to a surface which also has a hole through it, in particular for motor cars. The clip has a supporting plate 5 extending at right angles to the axis of the clip and a rectangular body 6 connected thereto. The body 6 is connected to the holding plate 5 by way of expanding and locking arms connected to one another by integral bending areas 13, 14, 15. The expanding and locking arms 11, 8 and 12, 9 respectively, are actuated by bending the body part 6 through 90 degrees to a position where it can be locked relative to the holding plate 5.

4 Claims, 6 Drawing Figures

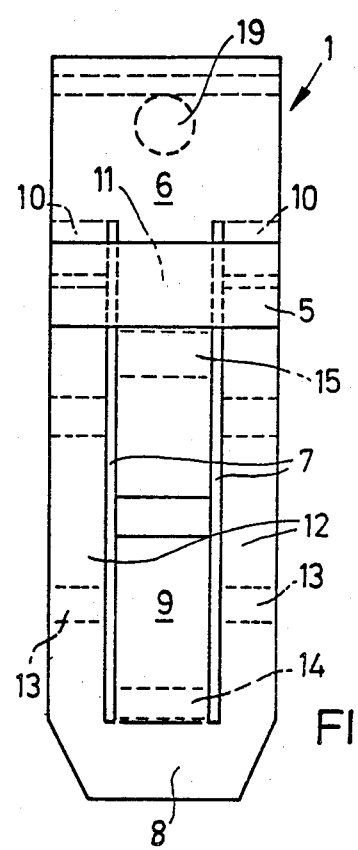
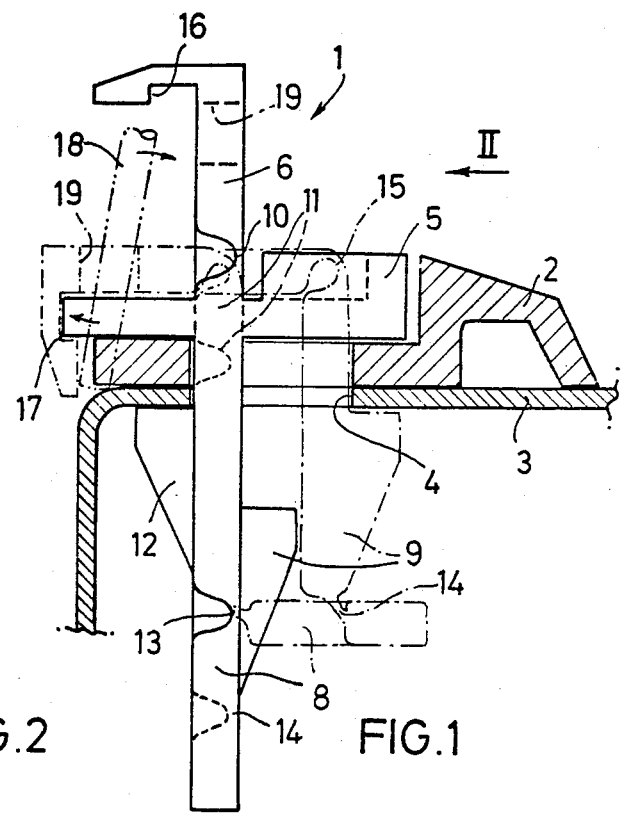
FIG.2  FIG.1
FIG.3
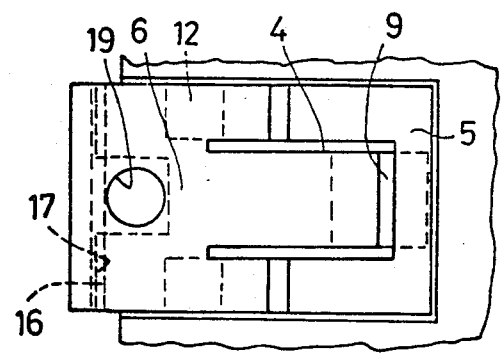

FASTENING CLIP FOR MOTOR VEHICLE TRIM

The invention relates to a fastening clip for fastening a component to a surface which has an aperture in it. Such clips are used for example to fasten trim panels to sheet metal panels of motor cars.

A fastening clip of a type such as this is known from German Pat. No. 27 18 170. In this case, expanding and locking arms of the clip are actuated by pressing axially on the body of the fastening clip. The arms may be unlocked again by an appropriate pull in the opposite direction.

According to the present invention, there is provided a fastening clip for fastening a component which has a hole through it to a surface which also has a registering hole through it, the clip comprising a rectangular body a supporting plate and a tongue extending generally at right angles to the plate, the tongue including first and second expanding arms and first and second locking arms, the first expanding arm being connected by an integral bending area to the second locking arm and the first locking arm being connected by an integral bending area to the second expanding arm, the first expanding arm and second locking arm being separated by slots from the first locking arm and the second expanding arm to permit relative movement therebetween and the end of the second locking arm remote from the supporting plate being connected by an integral bending area to the second expanding arm, the first expanding arm being extended through the supporting plate through the rectangular body and connected to the supporting plate by an integral bending area so that the extension can be bent about the last mentioned bending area to cause the first and second locking arms and the first and second expanding arms to form between them a four-sided shape.

The invention will now be described in more detail, by way of example, with reference to the accompanying drawings, in which:

FIG. 1 is a side view of a fastening clip according to the invention, shown in solid lines in its released state and in chain-dotted lines in its locked state;

FIG. 2 is an elevation of the fastening clip viewed in the direction of the arrow II in FIG. 1;

FIG. 3 is a top view of a fastening clip in its locked state;

Figure 4:
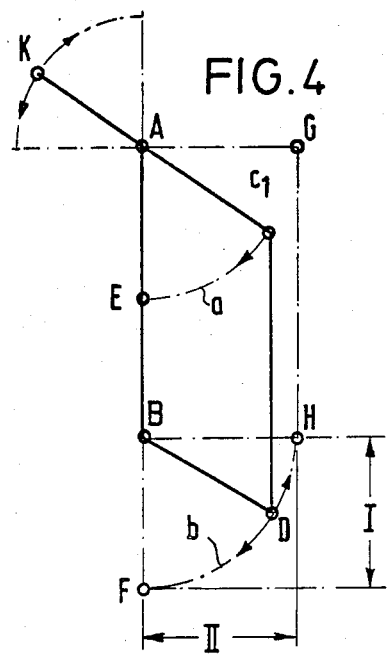
FIG. 4 shows the functioning principle of the fastening clip.

A fastening clip 1 provided for fastening a trim component 2 to a sheet metal part 3 which has a receiving opening 4 is shown in the figures.

The fastening clip 1 which is made in one piece, has a holding plate 5 and a rectangular body part 6. The rectangular body part 6 is separated by slots 7 from expanding and locking arms 8 and 9, which initially lie in the same plane as the body part. The body part 6 may be bent through 90 degrees with respect to the holding plate 5 by way of lateral bending areas 10 and has a rigid extension beyond the bending areas 10 which forms a first expanding arm 11. The lateral vertical parts of the body part 6 beyond the bending areas 10 form the first locking arms with laterally projecting abutments 12. The lower ends of these arms are connected by way of bending areas 13 to a second, U-shaped expanding arm 8, the base which is connected by way of another bending area 14 to a central second locking arm with a laterally projecting abutment 9. The upper end of the second locking arm is connected by way of a bending area 15 to the first expanding arm 11 again. Those regions of the clip below the supporting plate 5, i.e. regions 8, 9, 13 and part of 11, may be referred to as a tongue.

The free upper end of the rectangular body part 6 is provided with a locking edge 16, by means of which it may be locked with an edge 17 of the holding plate 5 after being bent through 90 degrees about the bending areas 10.

Figure 5:
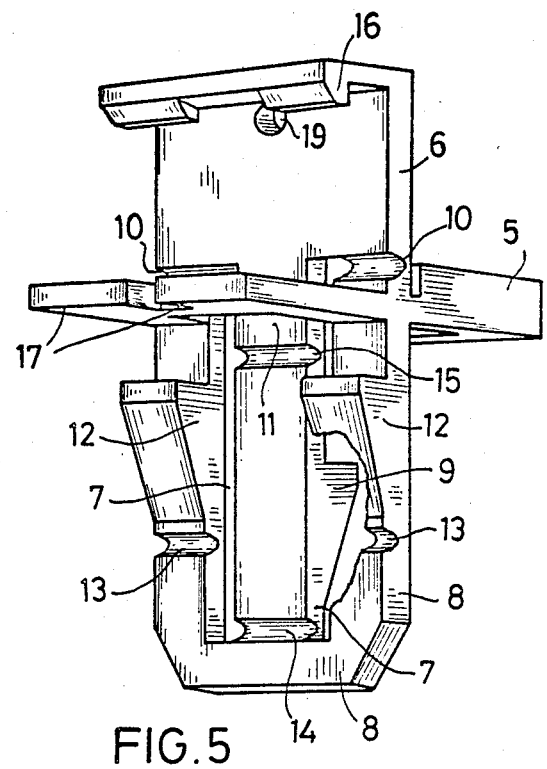
FIGS. 5 and 6 are oblique elevations of the fastening clip in the released and locked states.
Figure 6:
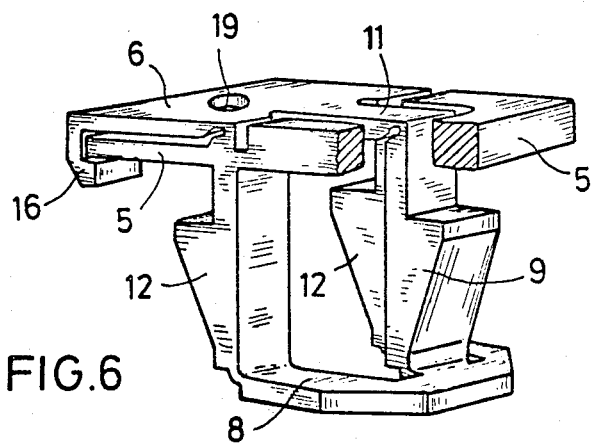

To apply the clip, the tongue is inserted through an aperture in the trim component 2 and through the aperture 4 in the sheet metal part 3. The abutment on the locking part 12 is then engaged under the sheet metal part at one side of the aperture. To lock the clip, the body part 6 is bent over and its edge 16 locked to the edge 17 of the plate 5. The effect of this bending is to deform the clip from the shape shown in FIG. 5 to that shown in FIG. 6. The end of the arm 11 pulls upwards on the locking arm 9 which has another abutment, and this arm in turn causes arm 8 to bend at 90 degrees to the locking arm 12. The arm 9 is thus moved to a position where its abutment surface is coplanar with those of the arms 12 and where it engages with the opposite side of the aperture, as shown in chain-dotted lines in FIG. 1.

In this way the fastening clip may be applied in a simple manner and locked securely by bending it through 90 degrees. The locking of the bent part by way of the locking edge 16 prevents the fastening clip from being unintentionally unlocked in the event of powerful forces acting upon the fastened attachment part.

The clip is unlocked by detaching the locking edge 16 and raising the body part 6. At the same time the second locking arm is moved into the plane of the first locking arms, so as to allow the clip to be withdrawn.

The locking edge 16 may be detached with the aid of a pin 18 (a nail or the like) which passes through a hole 19 in the body part 6 and through a corresponding opening in the plate 5 in order to release the locking edge 16 from the edge 17 of the holding plate 5.

FIG. 4 illustrates the functioning principle of the fastening clip. By virtue of their separation by the slots and the staggered arrangement of their bending areas the expanding and locking arms may be bent to form a parallelogram. By bending open the parallelogram the points C1 and D respectively move along arcs a and b about points A and B from points E and F towards points G and H. In this way the coordinates I (vertical) and II (horizontal) are traversed.

The coordinate I gives the joining of the parts (tightening). The coordinate II gives the underswing of the clip (expansion).

By extending the side A—C1 to point K it is possible to bend open the parallelogram from the outside using the lever arm AK.

The fastening clip described may be applied and locked in a simple manner but on the other hand it cannot be readily unlocked by a pull in the opposite direction, and thus has a good holding capacity.

I claim:

1. A fastening clip for fastening a component which has a hole through it to a surface which also has a registering hole through it, the clip comprising a rectangular body, a supporting plate and a tongue extending generally at right angles to the plate, the tongue including first and second expanding arms and first and second locking arms, the first expanding arm beng connected by an integral bending area to the second locking arm and the first locking arm being connected by an integral bending area to the second expanding arm, the first expanding arm and second locking arm being partially separated by slots from the first locking arm and the second expanding arm to permit relative movement therebetween and the end of the second locking arm remote from the supporting plate being connected by an integral bending area to the second expanding arm, the first expanding arm being extended from the rectangular body through the supporting plate and connected to the supporting plate by an integral bending area positioned between the rectangular body and the supporting plate so that the extension can be bent about the last mentioned bending area to cause the first and second locking arms and the first and second expanding arms to form between them a four-sided shape.

2. A fastening clip as claimed in claim 1, having a first locking arm and a second expanding arm on either side of the second locking arm and the first expanding arm, the ends of the second expanding arms being joined by a U-shaped arm with the second locking arm being connected by the integral bending area to the center of the U-shaped arm.

3. A fastening clip as claimed in claim 2, wherein the rectangular body is provided with a locking edge for engaging with an edge of the supporting plate.

4. A fastening clip as claimed in claim 1, wherein the rectangular body is provided with a locking edge for engaging with an edge of the supporting plate.

* * * * *